Jan. 29, 1935.  N. H. SANDBERG  1,989,293
MACHINE FOR CONSTRUCTING EGG FLATS AND CUSHION PADS
Filed Oct. 2, 1933  7 Sheets-Sheet 1

Fig. 1

Inventor
Nels H. Sandberg
By Caswell & Lagaard
Attorneys

Jan. 29, 1935. N. H. SANDBERG 1,989,293
MACHINE FOR CONSTRUCTING EGG FLATS AND CUSHION PADS
Filed Oct. 2, 1933 7 Sheets-Sheet 4

Inventor
Nels H. Sandberg
By Caswell & Lagaard
Attorneys

Jan. 29, 1935. N. H. SANDBERG 1,989,293
MACHINE FOR CONSTRUCTING EGG FLATS AND CUSHION PADS
Filed Oct. 2, 1933  7 Sheets-Sheet 5

Inventor
Nels H. Sandberg
By Caswell & Lagaard
Attorneys

Jan. 29, 1935.  N. H. SANDBERG  1,989,293
MACHINE FOR CONSTRUCTING EGG FLATS AND CUSHION PADS
Filed Oct. 2, 1933   7 Sheets-Sheet 6

Inventor
Nels H. Sandberg
By Carwell & Lagaard
Attorneys

Jan. 29, 1935. N. H. SANDBERG 1,989,293
MACHINE FOR CONSTRUCTING EGG FLATS AND CUSHION PADS
Filed Oct. 2, 1933 7 Sheets-Sheet 7

Patented Jan. 29, 1935

1,989,293

UNITED STATES PATENT OFFICE 1,989,293

MACHINE FOR CONSTRUCTING EGG FLATS AND CUSHION PADS

Nels H. Sandberg, St. Paul, Minn., assignor to Waldorf Paper Products Company, St. Paul, Minn., a corporation of Minnesota Application October 2, 1933, Serial No. 691,816

14 Claims. (Cl. 93—37)

My invention relates to machines for forming cushion pads and egg flats for use in conjunction with egg cases.

An object of the invention resides in providing a machine for forming cushion pads such as disclosed in the application for patent of Reynolds Guyer for Egg case cushion pads, Ser. No. 642,986, filed November 17, 1932.

Another object of the invention resides in providing a machine by means of which the pads such as described in said application may be automatically and continuously constructed.

A still further object of the invention resides in constructing the machine with corrugating rolls by means of which an elongated sheet of paper is continuously corrugated.

An object of the invention resides in applying ribbons to the sheet at the lateral marginal portions thereof for holding the sheet in corrugated form.

Another object of the invention resides in providing a folding mechanism for folding or tucking in the ends of the corrugations and for bringing the same against the ribbons.

An object of the invention resides in providing a corrugated roll with which the sheet travels and in constructing said roll with fingers adapted to move into engagement with the ends of the corrugations to fold or tuck in the same.

A feature of the invention resides in slidably mounting said fingers for longitudinal movement and in disposing said fingers within the valleys of the corrugations.

An object of the invention resides in providing guideways in the ends of said roll and in constructing the fingers with shanks slidable along said guideways.

Another object of the invention resides in providing bores communicating with said guideways and of larger diameter than the minimum transverse dimension of said guideways and in providing rods extending outwardly from said shank and concentrically disposed within said bores.

An object of the invention resides in providing washers within said bores seated against the shoulders formed between said bores and guideways and in providing other washers fixed relative to said fingers and capable of movement away from said first named washers and in further providing compression coil springs between said washers for urging said fingers outwardly.

A feature of the invention resides in providing fixed cams for engagement with the protruding ends of said rods for successively operating said rods as the roll is rotated.

A still further object of the invention resides in providing scoring disks for creasing the corrugations transversely of the corrugations and in locating said scoring disks so as to form the score lines in proximity to the inner edges of the ribbons.

An object of the invention resides in securing the ribbons to the corrugated sheet through adhesive and in applying heat to the composite structure after the ribbons have been applied thereto for the purpose of setting the adhesive.

A still further object of the invention resides in arranging said scoring disks at a locality beyond the heating apparatus so as to cause the scoring of the corrugations after the ribbons have been firmly secured thereto.

Other objects of the invention reside in the novel combination and arrangement of parts and in the details of construction hereinafter illustrated and/or described.

Figures 9, 12:
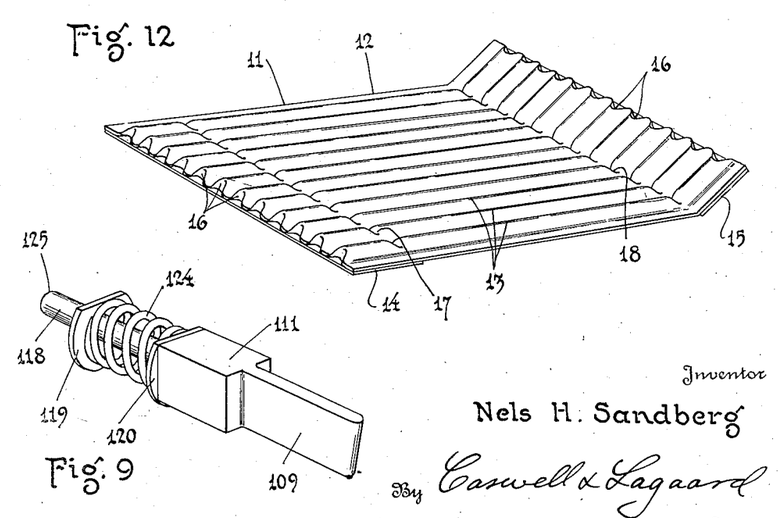
Fig. 9 is a perspective view of one of the fingers shown in Figs. 7 and 8.
Fig. 12 is a perspective view of one of the cushion pads constructed with my invention.
Figure 10:
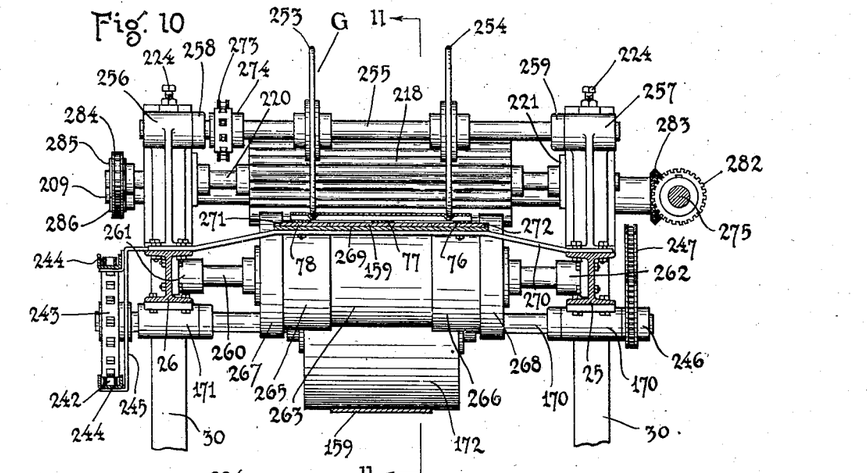
Fig. 10 is a cross sectional view taken on line 10—10 of Fig. 2.

The particular form of cushion pad or egg flat adapted to be manufactured upon my improved machine, is illustrated in Fig. 12. This cushion pad consists of a body portion 11 which is constructed from a sheet of paper stock 12. This sheet is corrugated transversely thereof to provide corrugations 13 which are exposed at the upper and lower sides thereof intermediate the edges of the sheets and the ends of said corrugations. At the ends of the corrugations are attached to the sheet two ribbons 14 and 15 which are secured to the corrugations through a suitable adhesive applied between the corrugations and said ribbons. The extreme ends of the portions of the corrugations which project upwardly beyond the ribbons are folded or tucked in as designated at 16 to form a beveled edge by means of which the cushion pads are more readily inserted into the egg case in which they are to be used. In proximity to the inner edges of the two ribbons 14 and 15 are provided score lines 17 and 18 which extend across said corrugations and cause the corrugations to fold along such lines. By means of this construction flanges 19 and 20 are formed at the ends of the cushion pad which are adapted to lie against the sides of the case and to cushion the fillers for endwise movement. If desired, a ribbon may be applied to the center of the corrugations to further stiffen and reinforce the same. The present invention forms the corrugations in the sheet, applies the ribbons to the sheet, heats the composite structure to dry the adhesive and cause the same to set, thereafter scores the sheet at the proper locality and finally cuts off the sheet into sections forming the individual cushion pads.

My invention proper consists of a machine which I have indicated in its entirety by the reference character A. This machine comprises a corrugating mechanism B by means of which a strip of paper 21 of a width equal to the width of the cushion pad and wound in a roll 22 is transversely corrugated. The said machine further includes a mechanism C by means of which a number of ribbons 23 are applied to and forced against the corrugations along the ridges of the same. By means of an adhesive applying device D adhesive is applied to the corrugations for the purpose of causing the ribbons to stick to the corrugated sheet. The invention further includes a folding mechanism E by means of which the ends of the corrugations are folded or tucked in and caused to lie against the end ribbons of the sheet. As the formed structure leaves the mechanism E the same is heated and dried through a drying mechanism F by means of which the adhesive applied to the ribbons is caused to set. Thereafter the formed sheet passes through a scoring device G and finally is cut off in sections of the required length by means of transverse cutting mechanism H which forms the individual cushion pads. The supporting structure of the machine and the various mechanisms referred to will now be described in detail.

Figure 1:
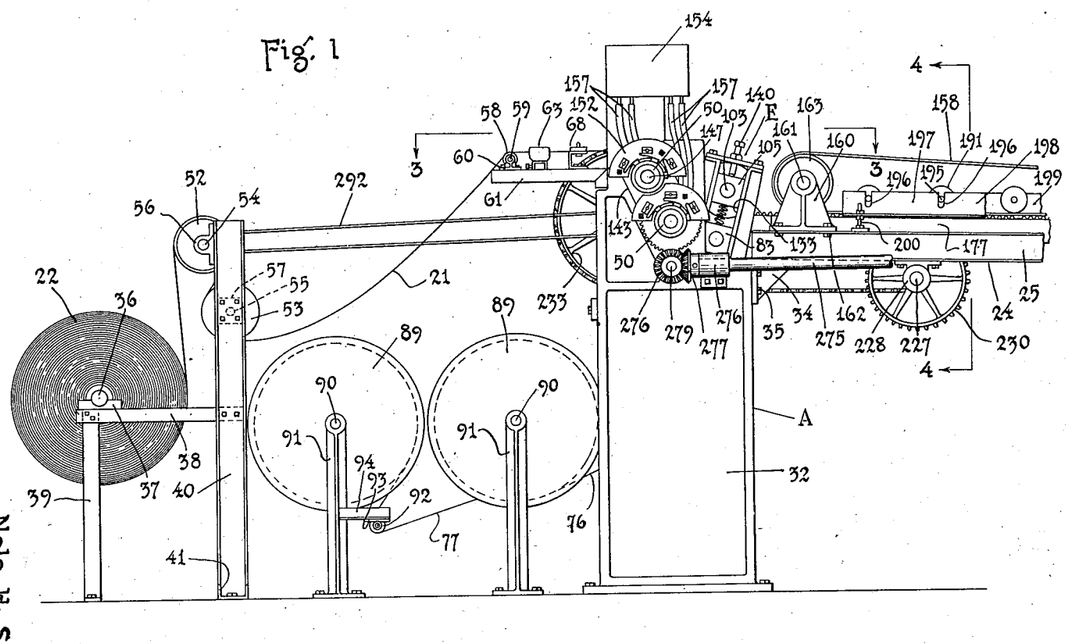
Fig. 1 is an elevational view of the feed end of a machine for forming cushion pads and egg flats and illustrating an embodiment of my invention.
Figure 2:
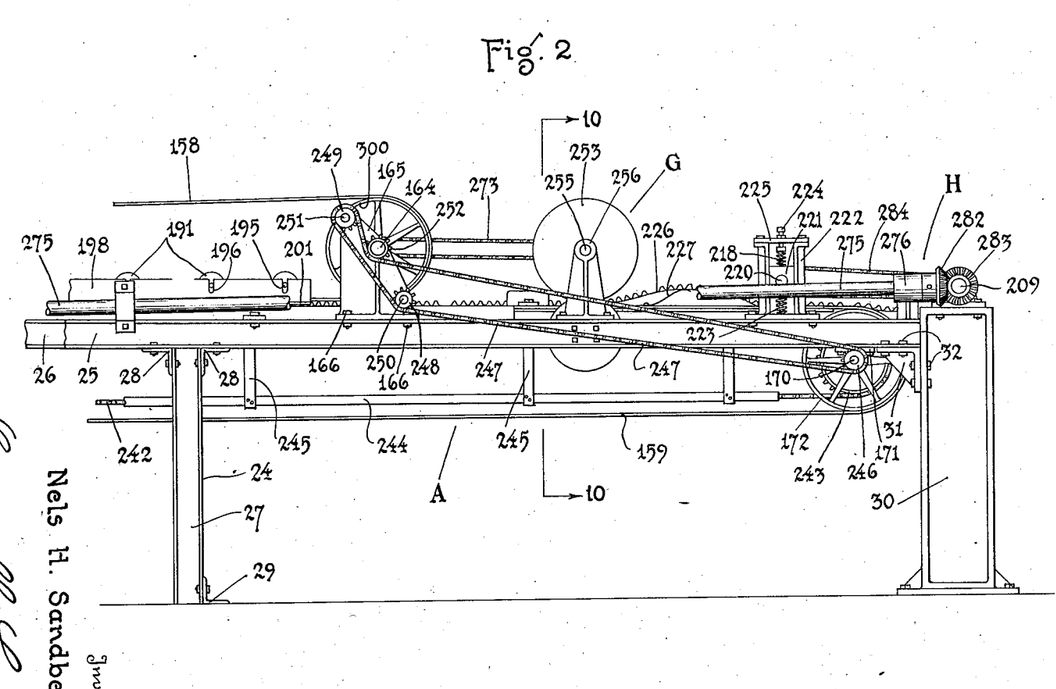
Fig. 2 is an elevational view of the discharge end of the portion of the machine shown in Fig. 1.

My egg cushion pad forming machine A is carried by a framework 24 best shown in Figs. 1 and 2. This framework comprises two longitudinally extending I beams 25 and 26 which extend along the discharge end of the machine and throughout the intermediate portion of the machine. These I beams are supported at their ends on posts 27 which are regularly spaced and which are attached to the longitudinal beams 25 and 26 through transverse frame members 28 and 29. The posts 27 may also be constructed as I beams while the cross frame members 28 and 29 are preferably angles which hold the posts and said longitudinal beams in spaced relation. At the discharge end of the machine are provided two uprights 30 which are preferably formed as castings and which lie in continuation of the two longitudinal beams 25 and 26. The said beams are attached to these uprights by means of brackets 31 which are bolted to the said beams through bolts 32.

At the feed end of the machine A are provided uprights 32 and 33 which are similar to the uprights 30. These uprights are constructed as castings which are formed to provide bearings for certain of the shafting and which are also constructed to support the forward ends of the two longitudinal beams 25 and 26. For this purpose brackets 34 are employed which are bolted to the said beam and uprights through bolts 35. At the feed end of the machine is also provided other supporting structure for the various materials used in the invention.

The roll of paper 22 from which the sheet 21 is unwound and from which the cushion pads are constructed is rotatably mounted upon a shaft 36. This shaft is supported in two V blocks 37 which rest upon and are attached to horizontal frame members 38. The frame members 38 are attached to two posts 39 and to two uprights 40 in front of the framework proper 24. The frame members 38 and posts 39 may be constructed as bars of metal or may be constructed from any other suitable material while the uprights 40 are preferably constructed as channels. These members are preferably formed with feet 41 by means of which the same may be bolted to the floor upon which the machine is erected.

Figure 5:
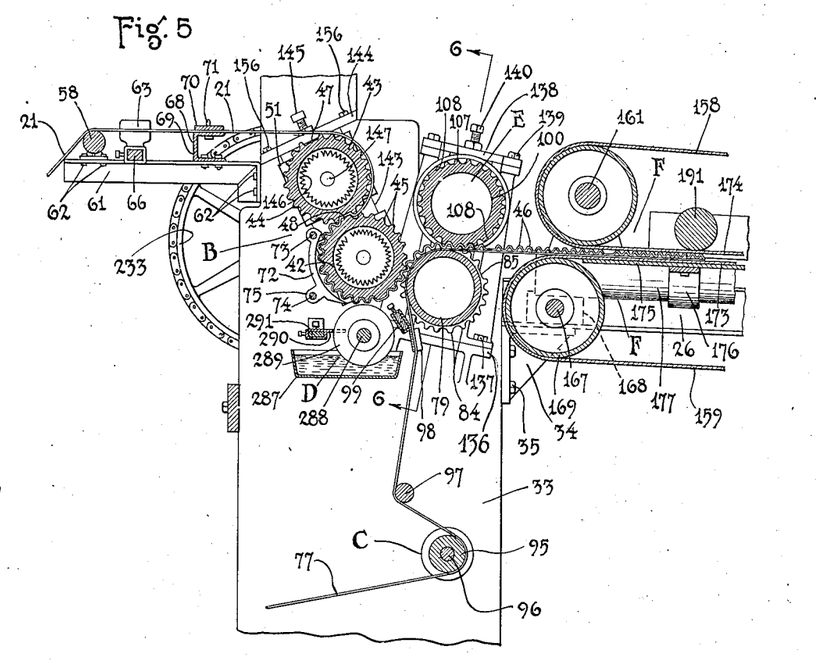
Fig. 5 is a longitudinal elevational sectional view taken on line 5—5 of Fig. 3.

The corrugating mechanism B consists of two corrugating rolls 42 and 43 which are constructed with corrugations 44 and 45 extending longitudinally of said rolls and upon the exterior thereof. Said corrugations are adapted to mesh with one another and are so arranged that when the sheet 21 is fed between the said rolls the corrugations 45 in the sheet 21 are formed which provide the corrugations 13 in the finished cushion pad. The roll 44 is constructed at suitable localities about the circumferential extent thereof with depressions 47 which extend longitudinally of the roll and which are of a width greater than that of the corrugations while the roll 42 is similarly constructed with raised portions 48 adapted to enter the depressions 47. By means of this construction blank portions are formed at the ends of the cushion pad which are adapted to be sheared in the severing of the various pads from the formed sheet. The two rolls 42 and 43 are constructed hollow as shown in Fig. 5 and are provided with end members 49 secured thereto. These end members have trunnions 50 issuing outwardly therefrom which are journaled in bearings 51 mounted in the two uprights 32 and 33. In this manner the said rolls are journaled for rotation.

For the purpose of feeding the paper to the corrugating mechanism, two idler rollers 52 and 53 are employed. These rollers are provided with shafts 54 and 55 which are journaled in bearings 56 and 57 bolted to the uprights 40. Both the rollers 52 and 53 are disposed above the roll of paper 22 and the paper in passing to the machine proper passes upwardly over the roller 52 and then downwardly and beneath the roll 53.

The paper upon entering the machine passes over the top of the roll 43. For guiding it in position another idler roller 58 is employed which is constructed at its ends with trunnions 59 journaled in bearings 60. Bearings 60 are mounted on brackets 61 which are bolted to the uprights 25 and 26 through bolts 62. For maintaining lateral alignment of the sheet, two guides 63 are employed which are slidably mounted upon a bar 66. This bar is attached to the brackets 61. By means of suitable set screws 67 the guide 66 may be positioned wherever desired.

To prevent slack in the sheet of paper 21 in advance of the first corrugating roll 43 a brake 68 is employed. This brake is situated between the roll 58 and the roll 43. Brake 68 includes a bar 69 which extends across and is attached to the two brackets 61. Bar 69 may be constructed in the form of a channel or a solid piece of metal may be employed. Another bar 70 superimposes the bar 69 and is guided for vertical movement with respect thereto through a number of dowel pins 71 secured to the bar 69. The sheet of paper 21 passes between the two bars 68 and 69 and the weight of the bar 69 provides suitable friction to prevent slack between the brake and the roll 43.

In order to hold the corrugated sheet in position with respect to the roll 42, a number of arcuate fingers 72 are employed which partially encircle the said roll. The fingers 72 are mounted upon two rods 73 and 74 secured to the uprights 32 and 33. These fingers are constructed with bosses 75 through which the said rods extend and are adjustably secured to said rods through set screws, not shown. The fingers 72 are sufficiently spaced from the outer periphery of the roll 42 to permit the corrugated stock to pass freely between said fingers and the rolls. By means of this construction the sheet is positively fed about the rolls and the corrugations prevented from being straightened out.

Figure 4:
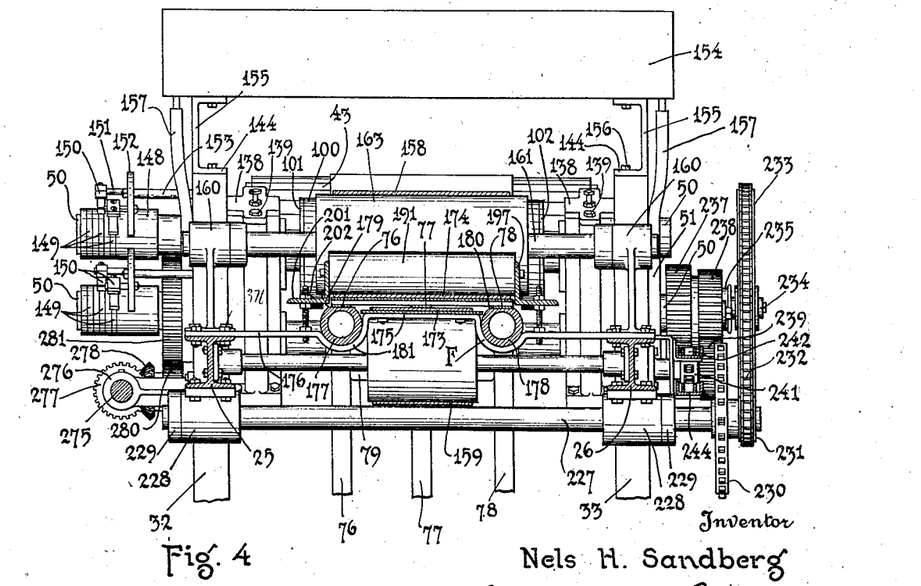
Fig. 4 is a transverse elevational sectional view taken on line 4—4 of Fig. 1.
Figure 6:
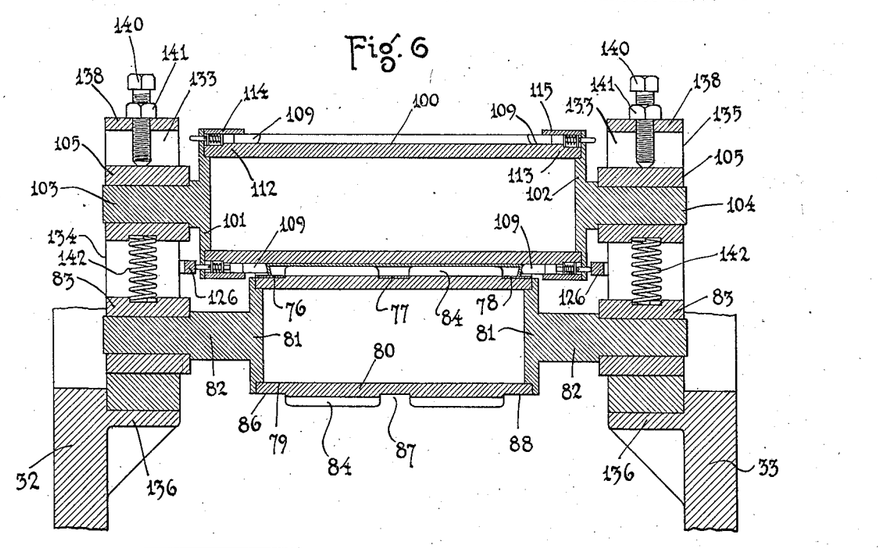
Fig. 6 is an elevational sectional view taken on line 6—6 of Fig. 5.

In the construction of the cushion pads three ribbons best shown in Fig. 4 and designated by the reference numerals 76, 77 and 78 are employed which are applied to the outer ridges of the corrugations 46 of the corrugated sheet and which form the ribbons 14 and 15 of the finished pad. This is accomplished through a roll 79 similar in construction to the roll 43. Roll 79 is best shown in Fig. 6 and is constructed with a cylindrical portion 80 having end members 81 attached thereto. The end members 81 are provided with trunnions 82 which issue outwardly therefrom and are journaled in bearings 83 supported by the uprights 32 and 33. The roll 79 is provided upon its exterior with corrugations 84 and with depressions 85 which are adapted to mesh with the corrugations 45 and the raised portions 48 of the roll 43. These parts of roll 79 are however turned down to provide circumferential tracks 86, 87 and 88 which lie inwardly of the innermost ridges of the corrugations a distance equal to the thickness of the various ribbons. The ribbons 76, 77 and 78 are fed in between the two rolls 79 and 42 and run along the tracks 86, 87 and 88. By the application of adhesive to the ridges of the corrugations 46 of the sheet 21 the same are caused to adhere to the various ribbons thereby attaching the ribbons to the corrugated sheet.

The ribbons 76, 77 and 78 are carried on reels 89 which are provided with shafts 90. These shafts are supported by standards 91 which are mounted on the floor in front of the framework 24 of the invention. The standards 91 are so arranged and the reels 89 are so mounted thereon that each respective reel feeds its ribbon to the machine in the proper position to cause the said ribbon to run along the respective tracks 86, 87 and 88 which correspond thereto. To cause the ribbon 77 to reel off at about the same elevation as ribbons 76 and 78, an idler roller 92 is employed which is journaled in bearings 93 attached to brackets 94 which are secured to the standard 91. Ribbon 77 passes under this roller. All of the ribbons in passing from the reels 89 pass over a number of flanged idler rollers 95 which are rotatably mounted on a shaft 96. Shaft 96 is attached to the uprights 32 and 33 and rollers 91 may be adjusted thereon to hold the ribbons in proper relation with respect to the tracks 86, 87 and 88. The ribbons also pass in back of a rod 97 secured to the frame members 32 and 33 extending transversely of the machine. From this rod the said ribbons extend upwardly and between guides 98 best shown in Fig. 5. From these guides the ribbons pass over the tracks 86, 87 and 88 of roll 79 where the same are pressed against the coated ridges of the corrugations of the sheet. The guides 98 are mounted upon a transverse bar 99 which is secured to the two uprights 32 and 33. These guides may be adjustably secured to said uprights in any manner and if desired may be mounted thereon in a manner similar to the guides 63 previously described.

The adhesive is applied to the ridges of the corrugations 46 of the formed sheet through the adhesive applying device D previously referred to. This device includes a pan 287 which is supported between the two uprights 37 and 33. Above this pan is mounted a shaft 288 which is journaled in suitable bearings secured to the said uprights but not shown in the drawings. This shaft carries a number of rollers 289 which are adapted to dip into the adhesive contained in the pan 287 and to apply the same to the ridges of the corrugations. The surplus adhesive is scraped from the sides of the said rollers through scrapers 290. These scrapers are adjustably mounted upon a bar 291 which is attached to the uprights 32 and 33. By means of this construction surplus adhesive is prevented from being applied to the sheet and economy in the use of adhesive results. At the same time the adhesive does not project outwardly beyond the edges of the ribbons applied to the corrugated sheet. The rollers 289 are driven through frictional engagement with the sheet as the same travels with the roll 42.

As the corrugated sheet together with the ribbons attached thereto pass over the upper portion of the roll 79 the exposed ends of the corrugations of the sheet are folded or tucked inwardly as illustrated in Fig. 12. For this purpose the mechanism E is employed. This mechanism comprises a roll 100 which is cylindrical and hollow and which has attached to the ends thereof heads 101 and 102. These heads have formed on them trunnions 103 and 104, by means of which the drums are rotatably mounted. The trunnions 103 and 104 are journaled in bearings 105 which are carried by the uprights 32 and 33. The heads 101 and 102 are secured to the roll proper through screws 106 shown in detail in Fig. 8. Upon the outer surface of the roll 100 are formed corrugations 107 which are adapted to mesh with the corrugations 84 of the roll 79. This roll is also constructed with raised portions 108 which mesh with the depressions 85 of the said roll 79. The roll 100 is considerably longer than the roll 79 and the mechanisms for folding or tucking in the corrugations of the sheet are arranged at the ends of the said roll.

Figure 8:
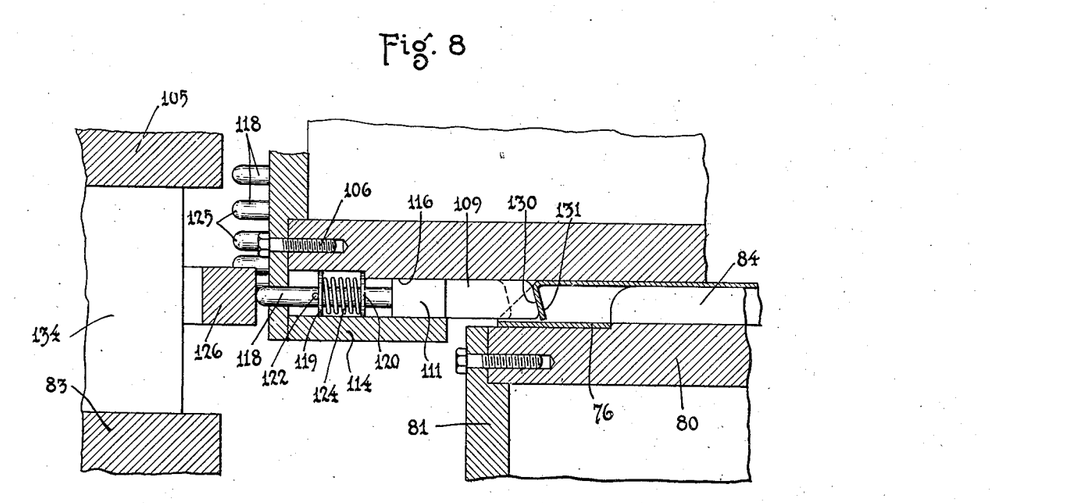
Fig. 8 is a plan sectional view of the structure shown in Fig. 7, taken on line 8—8 of Fig. 7.

The folding mechanism consists of a plurality of the fingers 109 best shown in Figs. 8 and 9, there being one finger for each of the valleys 100 between the various corrugations 107 of the roll 100. These fingers are constructed with rectangular shanks 111 which are slidably mounted in grooves 116 milled in the end portions 112 and 113 of the roll 100. Two rings 114 and 115 fit over the ends of the said roll and hold the shanks 111 within the grooves 116. These rings are held in position upon said roll through screws 129 which pass through said rings and are threaded into said roll. By means of this construction guides are formed whereby the shanks 111 are slidably mounted for movement along the grooves 116 which serve as guideways permitting the fingers 109 to be moved longitudinally along the various valleys 110 between the corrugations 107. At the ends of the grooves 116 are provided bores 117 which are of a diameter greater than the lesser dimension of the said grooves. By means of this construction shoulders 121 are provided between the said bores and grooves. Each of the shanks 111 is provided with a rod 118 which extends outwardly therefrom and which is centrally disposed within the corresponding bore 117. Upon these rods are mounted washers 119 and 120. The washers 120 abut against the shoulders 121 while the washers 119 are held from endwise movement along the said rods through cotter pins 122 which extend through said rods. The rods 118 are guided for sliding movement along said bores through drilled holes 123 in the heads 101 and 102 and project outwardly beyond said heads. Encircling the rods 118 are compression coil springs 124 which are seated against the two washers 119 and 120. These springs serve to urge the fingers 109 outwardly and the movement of the said fingers is limited by the pins 122 engaging the heads 101 and 102.

Figure 7:
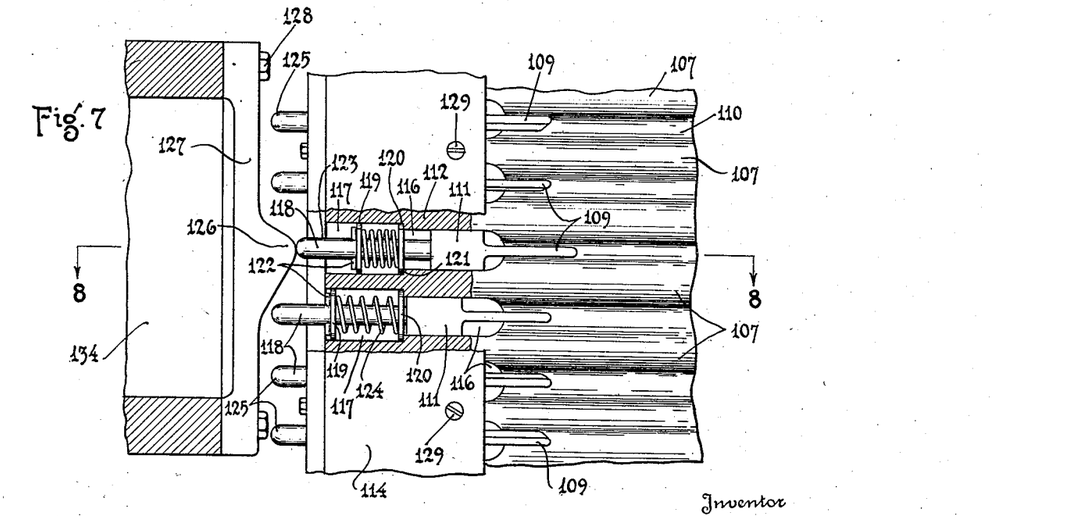
Fig. 7 is a fragmentary elevational view of the structure for folding in the ends of the corrugations.

The ends of the various rods 118 are constructed rounded as indicated at 125 and are adapted to be engaged by fixed cams 126. There is one such cam for the fingers at each end of the roll 100 and only that shown in Fig. 7 will be described. This cam consists of a bar 127 with which the cam is integrally formed. The said bar extends across the supporting structure for the bearings 105 and is bolted thereto through bolts 128. The cam 126 is so located that each particular finger 109 is operated when the corrugation with which it is associated is tangent to the roll 79.

The fingers 109 are narrow, being somewhat narrower than the width of the corrugations and are constructed with angular ends 130 best shown in Figs. 8 and 9. When the said fingers are pushed inwardly the ends 131 of the corrugations are forced inwardly and against the ribbons 76 and 78. The exact manner of folding this portion of the structure inwardly is shown in Fig. 8. The appearance of the folded or tucked in structure is disclosed in Fig. 12.

The method of supporting the two rolls 79 and 100 is shown in Fig. 6. The bearings 83 and 105 previously referred to are rectangular and are slidably mounted in vertically extending slots 133 formed in two bearing supports 134 and 135. These bearing supports are bolted to brackets 136 formed upon the inner surface of the two uprights 32 and 33 by means of bolts 137. The upper ends of these supports have attached to them bridge members 138 which are bolted thereto through bolts 139. These bridge members are tapped to receive adjusting screws 140 which engage the uppermost bearings 105 and urge the same downwardly. Lock nuts 141 serve to hold these adjusting screws in proper position. Between the bearings 83 and 105 are compression coil springs 142 which urge the lowermost bearings 83 against the bottoms of the grooves 133 and which urge the uppermost bearings 105 against the screws 140. By means of this construction the distance between the two rolls 79 and 100 can be adjusted at will. The two rolls 42 and 43 are similarly mounted to the rolls 79 and 100. These latter rolls are journaled in the bearings 51 previously referred to which slide in grooves 143 directly formed in the uprights 32 and 33. Bridge members 144 extending across the upper end of these grooves hold the said parts in proper position. Adjusting screws 145 serve the same function in conjunction with the rollers 42 and 43 as the adjusting screws 140 previously referred to. Inasmuch as the exact construction of the supporting structure of these bearings is substantially the same as that for the bearings 83 and 105, the same has not been shown in detail.

In the corrugating of the paper from which the cushion pads are constructed, the paper is first moistened as by a steam spray which is directed against the sheet 21 as the said sheet leaves the roller 53. As the corrugations are formed in the sheet through the passage of the sheet about the two rolls 42 and 43, heat is applied to each of these rolls to cause the sheet to take a permanent set and retain the corrugations formed therein. For the purpose of heating these rolls, each roll is provided with a heating element. The heating element being identical for both rolls, only that used in conjunction with roll 43 will be described in detail. As previously stated, the roll 43 is made hollow and within the same is mounted an electrical coil 146 constructed of suitable resistance wire composed of a nickel chromium alloy or some other suitable substance. This heating coil is imbedded in an insulating material and is arranged in close proximity to the inner wall of the said roll. The coil is preferably tapped in the center and the three leads from the coil taken out through a bore 147 formed in the trunnion 50. This trunnion is provided at the end thereof with an insulated sleeve 148. Sleeve 148 carries three slip rings 149 which are connected to the three terminals of the resistance coil 146. Suitable brushes 150 are in contact with the said slip rings, said brushes being mounted on brush holders 151 secured to an insulated mounting 152. Mounting 152 is attached through stud bolts 153 to the upright 32 of the frame 24. Suitable electrical conductors may be run to said brush and furnish the energy for procuring the necessary heat.

Due to the heating of the rolls 42 and 43 the bearings thereof become undesirably hot. To avoid this disadvantage the same are preferably cooled. For this purpose a water tank 154 is employed which is supported on channel members 155 which are integral with the bridge members 144 and are secured to the upper ends of the uprights 32 and 33 through cap screws 156 which extend through said bridge members. The various bearings 51 of the said rolls are formed with water conduits therein, not shown, which are connected by flexible tubes 157 best shown in Fig. 1 to the tank 154. As the said bearings heat up, circulation of water is set up which assists in cooling the bearings and in procuring proper lubrication for the said rolls.

The corrugated sheet with the ribbons applied to the same is caused to travel between two endless belts 158 and 159 after the same leaves the two rolls 79 and 100. The belt 158 is slightly wider than the width of the formed sheet while the belt 159 is considerably narrower, being of a width such as to be wholly confined within the space between the two ribbons 76 and 78. These belts are supported in the following manner: Attached to the two frame members 25 and 26 in close proximity to the uprights 32 and 33 are two bearings 160. A shaft 161 extending transversely of the frame 24 is journaled in these bearings. These bearings are bolted to the frame members 25 and 26 through bolts 162. Shaft 161 carries a pulley 163 over which the belt 158 passes. At the other end of the frame 24 is provided another shaft 164. This shaft carries a pulley 300 and is journaled in bearings 165 mounted on the frame members 25 and 26 and secured thereto through bolts 166. The belt 159 is similarly mounted. Between the two longitudinal frame members 25 and 26 is provided a transverse shaft 167 which is journaled in bearings 168 attached to said frame members. This shaft carries a pulley 169 over which the belt 159 passes. At the other end of the frame 24 and in close proximity to the uprights 30 is provided another shaft 170. This shaft is journaled in bearings 171 bolted to the undersides of the two frame members 25 and 26. Shaft 170 carries a pulley 172 over which the other end of the belt 159 passes. It will be noted that the upper run 173 of belt 159 and the lower run 174 of the belt 158 are in close proximity to one another. These runs are spaced a distance apart sufficient to receive the formed sheet and between which the sheet travels. The run 173 of belt 159 rests upon a plate 175 which is supported at suitable intervals through cross bars 176 attached to the frame members 25 and 26 through bolts 376.

The drying mechanism F consists of two longitudinally extending pipes 177 and 178 which are planed flat along the upper surfaces thereof to provide ways indicated at 179 and 180. These pipes are so arranged that the surfaces 179 and 180 thereof lie flush with the upper surfaces of the run 173 of belt 159, said pipes being arranged one on each side of said belt. These pipes are further disposed so that the ribbons 76 and 78 ride upon the surfaces 179 and 180 as the formed sheet travels through the heating mechanism. The pipes 177 and 178 are supported through the cross bars 176 which are constructed with seats 181 adapted to receive said pipes. These pipes extend between the shafts 167 and 164 terminating short of said shafts. At the ends of the pipes adjacent shafts 167 are provided pipe fittings not shown, by means of which said pipes may be connected to a source of steam. Similar fittings at the other ends of the pipes serve to lead the condensation from the pipes back to the boiler or to any other suitable reservoir. It will be readily comprehended that the ribbons 75 and 78 after the same pass along the portions 179 and 180 of said pipes become heated and that the adhesive thereon is dried and caused to set. If desired, the ribbon 77 may be likewise heated through a suitable heater. However, with the two outer ribbons firmly attached to the sheet, it does not become necessary to heat the said intermediate ribbon, the corrugations being held in position through the outer ribbons.

In order to maintain the corrugated sheet in contact with the ribbon, the following construction is employed. Between the two runs of the belt 158 are arranged a plurality of rollers 191 which rollers are best shown in Figs. 1, 3, 4 and 5. Said rollers are of the full width of the belt 158 and engage the entire run thereof. Rollers 191 are constructed at their ends with trunnions 195 which are rotatably mounted in slots 196 formed in the upstanding legs 197 of two longitudinally extending angles 198 and 199. These angles form a support for the rollers 199 which are distributed through the length of the two heating pipes 177 and 178 at suitable intervals. The angles 198 and 199 are supported in spaced relation to the cross bars 176 through studs 200 which are attached to the cross bars 176 and which extend upwardly and through the horizontal legs 201 of said angles. Nuts 202 threaded on said studs and disposed one on each side of the legs 201 of said angles hold the angles in proper position. By means of said nuts the position of the angles may be adjusted so that trunnions 195 of rollers 191 ride freely in the grooves 196 permitting the weight of the rollers to bear down upon the run 174 of belt 158 and to cause sufficient pressure upon the said belts to bring the ribbons 76 and 78 into contact with the ways 179 and 180.

The individual cushion pads are constructed from the formed sheet by cutting the same off at suitable intervals and particularly along the spaces provided by the depressions 47 and the raised portions 48 of the two rolls 42 and 43. For this purpose a cutter shaft 209 is employed which is journaled in bearings 211 attached to the uprights 30. This shaft carries a number of arms 210 which are constructed with drilled bosses 212 through which the shaft 209 extends. By means of set screws 213 threaded in said bosses, said arms are securely attached to the shaft 209. The arms 210 have secured to them a cutting blade 214 which rotates with the shaft 209 and which is adapted to engage a stationary cutting blade 215. The latter blade is attached to brackets 216 secured to the inner surfaces of the two uprights 30. As the shaft 209 is turned in a counter-clockwise direction as viewed in Fig. 11, blade 214 engages blade 215 and shears a section of the formed sheet to construct the various egg flats or cushion pads. The plate 175 on which the sheet travels extends up to the pulley 172. The sheet is carried in the open from the said pulley to the blade 215.

Figure 11:
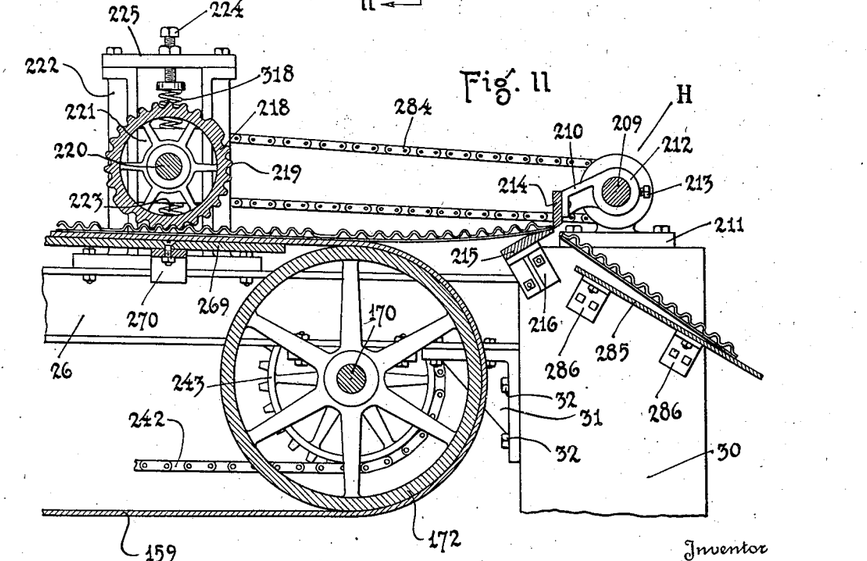
Fig. 11 is an elevational section view taken on line 11—11 of Fig. 10.

As the cushion pads are severed by the cutting device H, the same are discharged from the machine and disposed upon a chute 285 best shown in Fig. 11. This chute consists of a plate and is arranged in inclined position which is supported upon a number of clip angles 286 secured to the inner surfaces of the uprights 30.

In order to cause the cutting device H to operate in the desired location of the strip, a feed roller 218 is employed which is constructed with corrugations 219 adapted to fit into the corrugations 46 formed in the sheet. This roller is mounted on a shaft 220 which is journaled in bearings 221. Bearings 221 are slidably mounted in bearing supports 222 similar to the bearing supports 134 and 135. These bearings are adjustably supported in the said bearing supports through compression coil springs 223 which urge the said bearings upwardly and through similar springs 318 which urge the same downwardly. By means of adjusting screws 224 threaded in bars 225 extending across the upper ends of said uprights, suitable tension is applied to the springs so that the bearings float between the said springs. By means of this construction the feed roller may follow the corrugations of the formed sheet and serves to maintain the feed relation between the cutter and the sheet so that the sheet is accurately cut off at the blank space formed by the depressions 47 and the raised portions 48 of the rolls 42 and 43, thereby procuring uniformity in the ultimate product.

To prevent tearing of the sheet in the event that the corrugations at any locality may be inaccurately formed the sheet is arched upwardly as designated at 226 in Fig. 2. This portion of the sheet is supported through a leaf spring finger 227 which is attached to plate 175. This finger normally holds the sheet in the position shown. In the event that the sheet becomes too long the arc increases and if the sheet becomes too short the arc decreases. In this manner tearing or injury to the sheet is prevented.

The scoring device G is situated immediately in advance of the cutting mechanism H. This device consists of two scoring disks 253 and 254 which are rigidly mounted upon a shaft 255. Shaft 255 is journaled in bearings 256 and 257 secured to the upper portions of the longitudinal frame members 25 and 26. The shaft 255 is held from endwise movement with respect to the bearings 256 and 257 through collars 258 and 259 secured thereto. Immediately below the shaft 256 is another shaft 260. This shaft is journaled in bearings 261 and 262 secured to the longitudinal frame members 25 and 26. Shaft 260 carries a pulley 263 which is disposed immediately below the disks 253 and 254 and which supports the run 173 of belt 179. The pulley 263 is raised as indicated at 264 to receive the said belt which provides shoulders 265 and 266 along which the outer portions of the formed sheet ride. Flanges 267 and 268 at the ends of the pulley hold the formed sheet in proper position. It can readily be comprehended that the disks 253 and 254 form score lines in the sheet by means of which the end flanges on the formed cushion pad may be folded up. It will also be noted that the two disks 253 and 254 are positioned so that the said score lines are at the inner edges of the two outer ribbons 76 and 78.

Between the shaft 255 and the pulley 172 is provided a plate 269, which supports the upper run 173 of belt 159 at such locality, the plate 175 terminating at the pulley 263. Plate 269 is supported on cross bars 270 similar to the cross bars 176 which support the plate 175. These cross bars are attached to the two longitudinal frame members 25 and 26. Adjacent the edges of the belt 159 are provided two filler strips 271 and 272 which assist in supporting the formed sheet outside of the belt 159. By means of this construction the formed sheet is directed up to the end of the belt 159 and in proximity to the pulley 172 from which the same pass unsupported to the cutting mechanism H as previously described.

Figure 3:
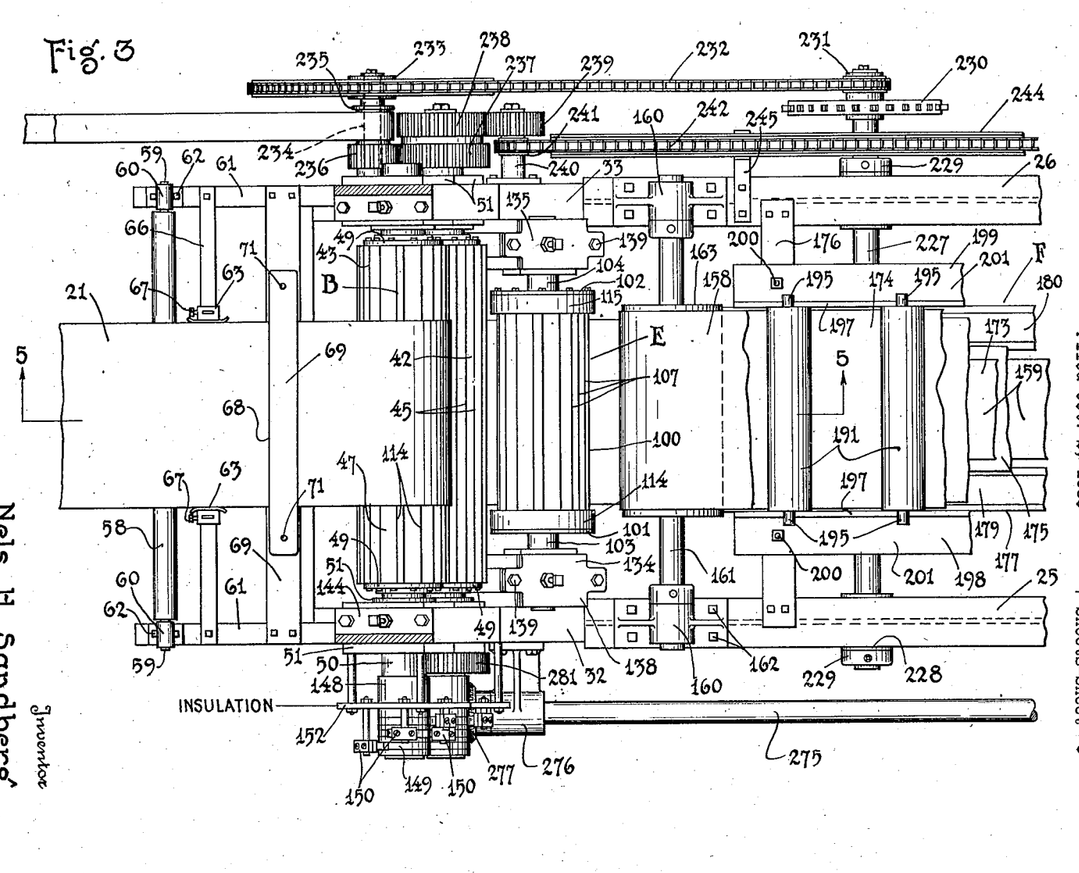
Fig. 3 is a plan sectional view of a portion of the structure shown in Fig. 1 taken on line 3—3 of Fig. 1.

The power transmission of the invention includes a main driving shaft 227 best shown in Figs. 3 and 4. This driving shaft is journaled in bearings 228 secured to the longitudinal frame members 25 and 26. The shaft 227 is held from endwise movement relative to these bearings through collars 229 secured to said shaft. A sprocket wheel 230 near one end of shaft 227 is connected by means of a chain to a motor not shown. Shaft 227 also has attached to it a sprocket pinion 231. A chain 232 passes over this sprocket pinion and over another sprocket wheel 233 rotatably mounted on a stub shaft 234. The stub shaft 234 is best shown in Fig. 3. The sprocket wheel 233 is formed integral with a pulley 235 and a spur pinion 236, all three of which rotate freely on the stub shaft 234. This shaft is secured to the upright 33 in any suitable manner. The spur pinion 236 meshes with a spur gear 237 fast on the trunnion of the roll 42. By means of this drive the roll 42 is positively driven. Inasmuch as the rolls 43, 79 and 100 are all formed with corrugations which mesh with one another all of these rolls are simultaneously driven through the roll 43. The driving force is of course transmitted by compression of the sheet of stock as the same passes between the rolls. However, the force required is not exceedingly great and the rolls may be driven without injury to the paper.

The feeding of the paper to the corrugating rolls is accomplished through the two rollers 52 and 53. The roller 53 is positively driven through a belt 292 which passes over the pulley 235 previously referred to and another pulley on the shaft 54, not shown. The speed of the belt 292 is such that the peripheral velocity of the pulley 52 is slightly greater than the rate of travel of the sheet of paper through the machine. When the feeding device is in operation, the roller 52 causes the feeding of the paper until slack occurs between the roller 58 and the roller 53. When such slack occurs the friction between the roller 52 and the paper is reduced and the said roller slips with respect to the paper. As soon as slack is taken up tension is procured in the paper and friction between the paper and the roller 52 occurs which again causes the feeding of the paper through the machine.

The two belts 158 and 159 are driven in the following manner. Integral with the gear 237 is another spur gear 238 which meshes with a pinion 239 revoluble on a stub shaft 240. Stub shaft 240 is secured to the uprights 33. A sprocket pinion 241 is fixed relative to the gear 238 and travels as a unit with it. A chain 242 passes over the sprocket pinion 241 and also over a sprocket wheel 243 fast on shaft 170. The two runs of the chain 242 are carried in channel guides 244 which are supported from the frame members 25 and 26 through hangers 245. In this manner the runs of the said chain are prevented from sagging unnecessarily. Shaft 170 also has attached to it a sprocket pinion 246. This sprocket pinion drives the shaft 164 through a chain 247. Chain 247 passes over two sprocket idlers 248 and 249 which are journaled on stub shafts 250 and 251 secured to the bearing 165. Said chain also passes about a sprocket wheel 252 on the shaft 164. It will be noted that the sprocket wheel 252 engages the back of the chain 247 while the sprocket wheel 246 engages the other side thereof so that the two shafts 170 and 164 travel in opposite directions. In this manner the two belts 158 and 159 are caused to travel in the proper directions to progress the formed sheet along the same.

The scoring device G is driven from a chain 273. This chain passes over a sprocket 274 fast on shaft 255 and over another sprocket secured to the shaft 164, but not shown.

The cutting mechanism H is operated through a longitudinally extending shaft 275. Shaft 275 is journaled in suitable bearings 276 which are secured to the longitudinal frame member 25. Shaft 275 has attached to it at the feed end of the machine a bevel gear 277 which meshes with another bevel gear 278 rotatably mounted on a stub shaft 279. Stub shaft 279 is secured to the upright 32 in a manner similar to the manner in which the stub shaft 240 is mounted. The bevel gear 278 is formed as a unit with a spur pinion 280 which meshes with a spur gear 281 fast on the trunnion of the roll 42. By means of this construction, shaft 275 is driven in the proper direction. At the other end of shaft 275 is provided another bevel gear 282 which meshes with a bevel gear 283 fast on the end of the shaft 209. The cutter H is hence positively driven through gearing from the corrugating roll 42 whereby synchronism of the said cutter with the forming of the corrugated sheet is procured.

The feeding device which includes the roll 218 is driven from shaft 209. This is accomplished through a chain 284 which passes over pulleys 285 and 286 secured to the shafts 220 and 209 respectively. This causes the roller 218 to move the sheet forwardly and also the blade 214 to operate in the required manner to shear off the sheet as the same is formed.

The operation of my invention may be summarized as follows: The sheet of paper which is wound on the roll 22 is unreeled therefrom and passes successively over the rollers 52, 53 and 58. The same then passes between the guides 63 and through the brake 68. On leaving roller 53 the paper is moistened. From the brake the paper passes over the roll 43 and between the two rolls 43 and 42 by means of which the various corrugations in the sheet are formed. The heating of these rolls causes the sheet to dry and the corrugations to become set. At the same time the ribbons 76, 77 and 78 are unreeled from the reels 89 and fed over the pulleys 95 and the rod 97. The same then passes between the guides 98 and along the grooves 86, 87 and 88 in the roll 79. Adhesive is applied to the ridges of the corrugations 46 of the sheet through the adhesive applying device D and the said ribbons caused to adhere to the sheet at the proper localities. As the sheet passes between the rolls 79 and 100 the various fingers 109 successively engage the cams 126 and fold the ends of the corrugations inwardly and against the outer ribbons. The formed sheet then travels between the two runs 173 and 174 of belts 159 and 158 with the marginal portions of the formed sheet riding upon ways 179 and 180 of the heating pipes 177 and 178. This causes drying and setting of the adhesive and the firm attachment of the ribbons to the corrugated sheet. After the formed sheet passes the end of belt 158 the same is scored by the scoring disks 253 and 254 and is finally fed between feeding roll 218 to the cutting mechanism H by means of which the various sheets are cut into proper form.

My invention is highly advantageous in that an extremely practical and efficient device is provided whereby cushion pads of the character described can be rapidly and accurately produced. By applying the adhesive to the ridges of the corrugations less adhesive is required than where the adhesive would be applied to the ribbons. By running the sheet over the heating device the adhesive is caused to set while the ribbons are held pressed against the corrugated sheet. In this manner the parts are firmly secured together and a rigid and substantial construction is provided. By scoring the sheet to form the bendable flanges after the ribbons have been secured to the sheet, danger of slipping of the ribbons with respect to the sheet and the spoiling of the sheets is entirely prevented.

Changes in the specific form of my invention, as herein disclosed, may be made within the scope of what is claimed without departing from the spirit of my invention.

Having described my invention, what I claim as new and desire to protect by Letters Patent is:

1. In a machine of the class described, means for forming corrugations in a sheet, means for temporarily holding the corrugations in form, means for applying a backing to the corrugations, and means for folding the ends of certain of the corrugations inwardly against said backing while the corrugations are held in form by said last named means.

2. In a machine of the class described, means for forming corrugations in a sheet, and for holding said corrugations temporarily in form, said means including a corrugated roll with which the corrugated sheet travels, and means for folding in certain of the corrugations when the corrugated sheet is in engagement with said roll.

3. In a machine of the class described, means for forming corrugations in a sheet, and for holding said corrugations temporarily in form, said means including a corrugated roll with which the corrugated sheet travels, and fingers movable along certain of the corrugations of the roll for endwise engagement with the ends of the corrugations of the sheet.

4. In a machine of the class described, means for forming corrugations in a sheet, and for holding said corrugations temporarily in form, said means including a corrugated roll with which the corrugated sheet travels, guides formed at the ends of said roll, and fingers guided by said guides and movable into engagement with the ends of certain of the corrugations of the sheet.

5. In a machine of the class described, means for forming corrugations in a sheet, and for holding said corrugations temporarily in form, said means including a corrugated roll with which the corrugated sheet travels, guides formed at the ends of said roll, fingers guided by said guides and movable into engagement with the ends of certain of the corrugations of the sheet, and means dependent upon the rotation of said roll for moving said fingers.

6. In a machine of the class described, means for forming corrugations in a sheet, and for holding said corrugations temporarily in form, said means including a corrugated roll with which the corrugated sheet travels, guides formed at one end of said roll, fingers guided by said guides and movable into engagement with the ends of certain of the corrugations of the sheet, the fingers at such end of the roll all moving past a certain locality, and a cam at such locality for moving the fingers along said guideways.

7. In a machine of the class described, means for forming corrugations in a sheet and for holding said corrugations temporarily in form, said means including a corrugated roll with which the corrugated sheet travels, circumferentially arranged longitudinally extending guides, formed at one end of said roll, fingers slidable along said guides and rotatable with said roll, and a fixed cam for moving the fingers along said guides.

8. In a machine of the class described, means for forming corrugations in a sheet, and for holding said corrugations temporarily in form, said means including a corrugated roll with which the corrugated sheet travels, circumferentially arranged longitudinally extending guides formed at one end of said roll, fingers slidable along said guides and rotatable with said roll, springs for urging said fingers outwardly and a cam for moving said fingers inwardly and against the action of said springs.

9. In a machine of the class described, means for forming corrugations in a sheet, and for holding said corrugations temporarily in form, said means including a corrugated roll with which the corrugated sheet travels, circumferentially arranged longitudinally extending guideways formed at one end of said roll, said guideways being rectangular in section and disposed inwardly of the ends of the roll, bores at the ends of the roll communicating with said guideways and of larger diameter than one of the dimensions of said guideways to form shoulders therebetween, fingers having shanks of rectangular cross section slidable along said guideways, a rod at the end of the shank of each finger, said rods being concentric with said bores, washers encircling said rods and seated against said shoulder, other washers on said rods and spaced from said first washers, said last named washers being held from movement with respect to said rods in a direction away from said first named washers, compression coil springs disposed between said washers for urging said fingers outwardly, and a cam for engagement with the ends of said rods for moving said fingers in opposition to said springs.

10. In a machine of the class described, means for forming transverse corrugations in an elongated sheet, means for feeding longitudinally extending ribbons to the sheet at the lateral marginal portions thereof, means for applying adhesive between the ribbons and sheet, means for heating the ribbons to cause the adhesive to set, and scoring disks for scoring the sheet across the corrugations, said disks being disposed to bring the score lines at the inner edges of said ribbons.

11. In a machine of the class described, means for forming corrugations in a sheet, and for holding said corrugations temporarily in form, said means including a corrugated roll with which the corrugated sheet travels, the corrugations of said roll being formed with ridges and valleys into which the corrugated sheet extends, means for applying ribbons to the sheet at the lateral marginal portions thereof, said ribbons being outermost, and fingers slidable along said valleys and engaging the ends of the corrugations of the sheet, said fingers operating to fold such portions of the corrugations against said ribbons.

12. In a machine of the class described, means for forming corrugations in a sheet and for holding said corrugations temporarily in form, said means including a corrugated roll with which the corrugated sheet travels, the corrugations of said roll being formed with ridges and valleys into which the corrugated sheet extends, means for applying ribbons to the sheet at the lateral marginal portions thereof, said ribbons being outermost and fingers slidable along said valleys, and engaging the ends of the corrugations of the sheet, said fingers being constructed with angular ends adapted to fold the ends of the corrugations against the ribbons.

13. In a machine of the class described, means for forming corrugations in an elongated sheet transversely of the sheet, means for applying a backing to the sheet, a finger disposed in proximity to one of the edges of the sheet, means for guiding said finger for movement in a plane transverse of the sheet, and means for moving said finger to fold the ends of certain of the corrugations inwardly against the backing.

14. In a machine of the class described, means for forming corrugations in an elongated sheet transversely of the sheet, means for applying a backing to the sheet, a finger disposed in proximity to one of the edges of the sheet, means for guiding said finger for movement in the direction of extent of the corrugations, and means for moving said finger to fold the ends of certain of the corrugations inwardly against the backing.

NELS H. SANDBERG.